(12) United States Patent
Inoue et al.

(10) Patent No.: US 10,731,725 B2
(45) Date of Patent: Aug. 4, 2020

(54) ACTIVE VIBRATION CONTROL DEVICE

(71) Applicant: HONDA MOTOR CO., LTD., Tokyo (JP)

(72) Inventors: Toshio Inoue, Wako (JP); Osamu Terashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 16/301,992

(22) PCT Filed: May 10, 2017

(86) PCT No.: PCT/JP2017/017633
§ 371 (c)(1),
(2) Date: Nov. 15, 2018

(87) PCT Pub. No.: WO2017/199801
PCT Pub. Date: Nov. 23, 2017

(65) Prior Publication Data
US 2019/0154108 A1  May 23, 2019

(30) Foreign Application Priority Data
May 17, 2016 (JP) .................. 2016-098389

(51) Int. Cl.
*F16F 7/10* (2006.01)
*F16F 15/03* (2006.01)
(Continued)

(52) U.S. Cl.
CPC ................ *F16F 15/03* (2013.01); *B60K 5/12* (2013.01); *B60K 5/1208* (2013.01); (Continued)

(58) Field of Classification Search
CPC .......... F16F 7/1011; F16F 7/104; F16F 7/108; F16F 7/116
See application file for complete search history.

(56) References Cited

U.S. PATENT DOCUMENTS 10,267,373 B2 * 4/2019 Inoue .................... F16F 7/1011
2010/0127442 A1 5/2010 Muragishi et al.
(Continued)

FOREIGN PATENT DOCUMENTS

CN 101324257 A 12/2008
CN 201982575 U 9/2011
(Continued)

OTHER PUBLICATIONS

Machine translation of CN 104747651 (no date).*
(Continued)

*Primary Examiner* — Nicholas J Lane
(74) *Attorney, Agent, or Firm* — Rankin, Hill & Clark LLP (57) ABSTRACT

An active vibration control device includes: a housing; a movable part including at least one movable mass member; an exciting coil that generates a magnetic field with an intensity corresponding to a current supplied to the exciting coil; a magnetic viscoelastic elastomeric member whose viscoelastic property changes in accordance with a magnitude of the magnetic field generated by the exciting coil; and a support member made of a non-magnetic material. The housing and the movable part are elastically connected with each other by both the magnetic viscoelastic elastomeric member and the support member.

3 Claims, 11 Drawing Sheets

(51) Int. Cl.
*F16F 15/08* (2006.01)
*F16F 15/02* (2006.01)
*B60K 5/12* (2006.01)
*F16F 7/108* (2006.01)

(52) U.S. Cl.
CPC ............ *F16F 7/1011* (2013.01); *F16F 15/02* (2013.01); *F16F 15/08* (2013.01); *F16F 7/108* (2013.01); *F16F 2222/06* (2013.01); *F16F 2230/0011* (2013.01); *F16F 2230/18* (2013.01)

(56) References Cited

U.S. PATENT DOCUMENTS

| 2012/0222929 | A1 | 9/2012 | Muragishi et al. | |
|---|---|---|---|---|
| 2013/0127098 | A1 | 5/2013 | Kim et al. | |
| 2017/0328433 | A1* | 11/2017 | Terashima | F16F 15/03 |
| 2018/0066723 | A1* | 3/2018 | Inoue | F16F 7/108 |

FOREIGN PATENT DOCUMENTS

| CN | 202510617 U | 10/2012 |
|---|---|---|
| CN | 103727167 A | 4/2014 |
| CN | 104747651 * | 7/2015 |
| DE | 10302468 B3 | 6/2004 |
| JP | 2001-234972 A | 8/2001 |
| JP | 2016-044717 A | 4/2016 |
| KR | 10-20090086566 A | 8/2009 |
| WO | 2012026332 A1 | 3/2012 |
| WO | 2016148011 A1 | 9/2016 |

OTHER PUBLICATIONS

International Search Report by ISA/JP dated Aug. 8, 2017, on PCT/JP2017/017633 (2 pages).
Written Opinion by ISA/JP dated Aug. 8, 2017, on PCT/JP2017/017633 (7 pages).
Chinese Office Action received in corresponding CN application No. 201780030434.8 dated Dec. 24, 2019 with English translation (10 pages).
Office Action received in corresponding Indian application No. 201847043209 dated May 22, 2020 (6 pages).

* cited by examiner

ACTIVE VIBRATION CONTROL DEVICE

TECHNICAL FIELD

The present invention relates to an active vibration control device

BACKGROUND ART

Dynamic dampers are widely used to reduce vibrations that occur in machines. A dynamic damper is made up of movable mass member and a spring with an eigenvalue of vibration that corresponds to a target frequency of vibration to be damped. The vibration is reduced by an inertial force of the movable mass member by utilizing the phenomenon that the movable mass member moves in an opposite phase to a vibration at the eigenvalue.

In this case, an eigenvalue of vibration ω, an eigenfrequency f, a spring constant K, and a mass M of the movable mass member have the following relationship.

$$f = \frac{\omega}{2\pi} = \frac{1}{2\pi}\sqrt{\frac{K}{M}} \qquad \text{[Equation 1]}$$

A generally used dynamic damper vibrates at an eigenfrequency that is determined by a ratio of the mass M of the movable mass member of the dynamic damper to the spring constant K in an opposite phase to inputted vibration, to reduce the vibration by utilizing an inertial force of the movable mass member. Thus, it is necessary to use one dynamic damper per one frequency of vibration to be damped. When using a plurality of dynamic dampers to handle a plurality of frequencies, the dynamic dampers may interfere with each other when their eigenfrequencies are close to each other, which may even possibly amplify the vibration instead of reducing the vibration.

When damping vibrations and noises that occur in a rotating machine entailing torque variations, a representative example of which is an engine of an automobile, the target frequency of vibration to be damped varies in accordance with the rotational speed of the engine. As a result, there are several frequencies of vibration that should be dealt with.

In view of this, there has been proposed a device in which a member made of magnetic viscoelastic elastomer (MRE) is used as a spring to realize a dynamic damper with variable eigenfrequency (see patent document 1). This is a variable dynamic damper technique that varies stiffness of rubber by mixing magnetic material into the rubber and controlling the intensity of a magnetic field applied to the rubber.

PRIOR ART DOCUMENT

Patent Document

Patent Document 1: WO 2012/026332

SUMMARY OF THE INVENTION

Problems to be Solved by the Invention

Figure 15A:
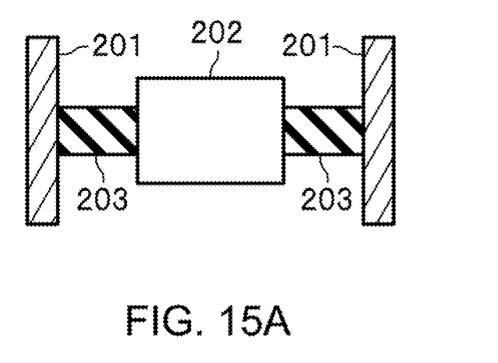
FIG. 15A is a conceptual diagram illustrating an active vibration control device.

FIG. 15A is a conceptual diagram illustrating a variable dynamic damper in which a magnetic viscoelastic elastomeric member is used. The reference sign 201 indicates a housing of the device. A movable mass member 202 is elastically connected via a magnetic viscoelastic elastomeric member 203 to the housing 201.

Figure 15B:
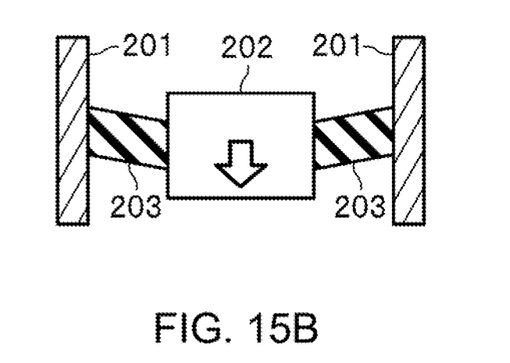

Such a configuration has the following problem. The gravity constantly applied to the movable mass member 202 may possibly cause overtime deterioration of the magnetic viscoelastic elastomeric member 203, with the consequence that the magnetic viscoelastic elastomeric member 203 is likely to elongate irreversibly (FIG. 15B).

Moreover, especially when using the variable dynamic damper in a low frequency range, the movable mass member 202 tends to be relatively heavy and the spring constant of the magnetic viscoelastic elastomeric member 203 that holds the movable mass member 202 have to be set to a low value. This causes the following problems. First, the spring constant of the magnetic viscoelastic elastomeric member 203 is lowered to lower the eigenfrequency thereof. This may possibly make the magnetic viscoelastic elastomeric member 203 unable to hold the movable mass member 202. In addition, the movable mass member 202 may possibly hangs down due to its own eight to cause an unusual sound occurring in the event of interference or the like. Moreover, the temperature of the magnetic viscoelastic elastomeric member 203 increases due to heat generated by an exciting coil or due to the environment in which the variable dynamic damper is used, which may possibly cause a decrease in the spring property of the rubber serving as a base of the magnetic viscoelastic elastomeric member 203, leading to durability problems. Moreover, managing the part characteristics of the magnetic viscoelastic elastomeric member 203 in mass production can be difficult due to property variations.

In view of the foregoing, it is an object of the present invention to provide an active vibration control device that can solve such a problem that the magnetic viscoelastic elastomeric member is likely to elongate irreversibly due to over time deterioration thereof caused by the gravity constantly applied to the movable mass member.

Solution to Problem (1) The present invention provides an active vibration control device having: a housing; a movable part including at least one movable mass member; an exciting coil that generates a magnetic field with an intensity corresponding to a current supplied to the exciting coil; a magnetic viscoelastic elastomeric member whose viscoelastic property changes in accordance with a magnitude of the magnetic field generated by the exciting coil; and a support member made of a non-magnetic material, wherein the housing and the movable part are elastically connected with each other by both the magnetic viscoelastic elastomeric member and the support member.

The present invention can solve such a problem that the magnetic viscoelastic elastomeric member is likely to deteriorate over time to elongate irreversibly due to the gravity constantly applied to the movable mass member.

(2) In the present invention according to (1), the support member may have a larger width in a direction along which the housing and the movable part is connected with each other than a width of the magnetic viscoelastic elastomeric member in the direction along which the housing and the movable part is connected with each other.

This aspect of the present invention allows for reliably supporting the movable mass member.

(3) In the present invention according to (1), the support member may be inserted in the magnetic viscoelastic elastomeric member.

This aspect of the present invention allows for handling the support member and the magnetic viscoelastic elastomeric member as an integrated member.

(4) The active vibration control device of the present invention according to (1) may further includes a plurality of magnetic members that forms an annular shaped, closed magnetic circuit through which the magnetic field generated by the exciting coil passes, wherein the movable part includes at least one of the plurality of magnetic members, and wherein the magnetic viscoelastic elastomeric member is disposed so as to connect the at least one of the plurality of magnetic members included in the movable part with another one of the plurality of magnetic members to form the closed magnetic circuit.

This aspect of the present invention allows magnetic flux to efficiently flow in the magnetic viscoelastic elastomeric member.

(5) In the present invention according to (1), the exciting coil may include two tiers of exciting coils, wherein the magnetic viscoelastic elastomeric member is located between the two tiers of exciting coils, and wherein the two tiers of exciting coils generate magnetic fields whose directions are opposite to each other so that a direction of magnetic flux from one of the two tiers of exciting coils and a direction of magnetic flux from other one of the two tiers of exciting coils are the same in the magnetic viscoelastic elastomeric member.

This aspect of the invention allows magnetic flux to efficiently flow in the magnetic viscoelastic elastomeric member.

Advantageous Effects of the Invention

The present invention provides an active vibration control device that can solve such a problem that the magnetic viscoelastic elastomeric member is likely to elongate irreversibly due to over time deterioration thereof caused by the gravity constantly applied to the movable mass member.

BRIEF DESCRIPTION OF THE DRAWINGS

FIGS. 15A and 15B are diagrams illustrative of problems to be solved by the present invention. FIG. 15B is a conceptual diagram illustrating a state of the active vibration control device in which

MODES FOR CARRYING OUT THE INVENTION

A first embodiment of the present invention is described below in detail, referring to the attached drawings.

First Embodiment

Figure 1:
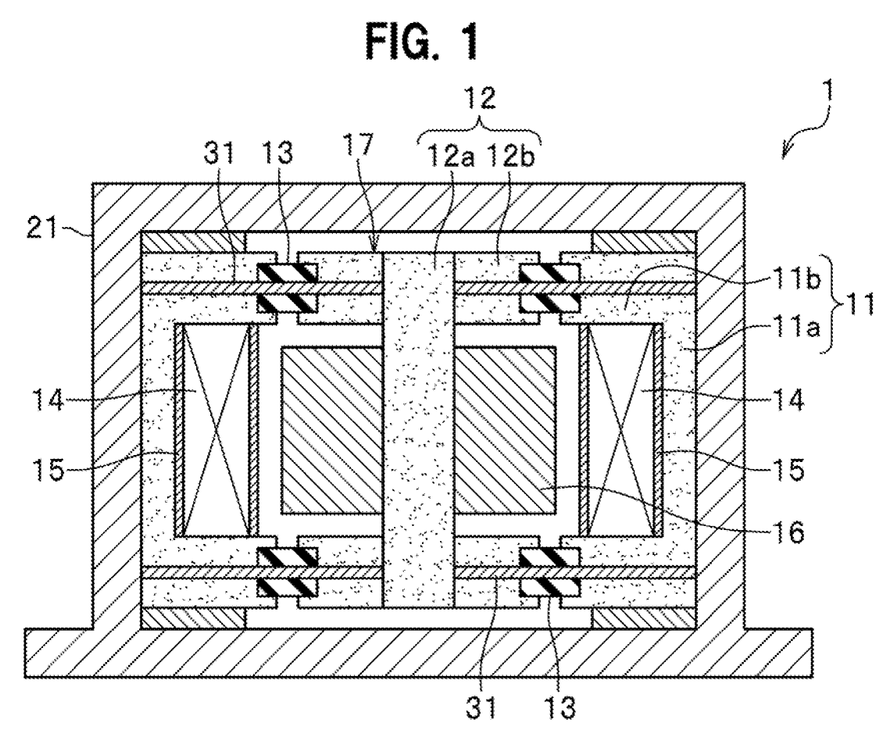
FIG. 1 is an elevational cross-sectional view of an active vibration control device according to a first embodiment of the present invention.

FIG. 1 is an elevational cross-sectional view of an active vibration control device 1 according to a first embodiment of the present invention.

The active vibration control device 1 has a housing 21 that is made of a non-magnetic material and is in a hollow circular cylindrical shape. The housing 21 houses a movable part 17, which can move in response to an input force from the outside, and a first magnetic core 11. The movable part 17 includes a second magnetic core 12 and a movable mass member 16. The housing 21 houses an exciting coil 14 for generating a magnetic field having intensity according to the current supplied thereto. The exciting coil 14 is made by winding a wire around a bobbin 15 having an annular shape.

The first magnetic core 11 and the second magnetic core 12 are a plurality of (two in this example) magnetic members that form an annular shaped, closed magnetic circuit through which the magnetic field generated by the exciting coil 14 passes.

The second magnetic core 12 is a member of the movable part 17 and includes a round pillar 12a extending in an axial direction of a round pillar 11a and a second extending part 12b extending from the round pillar 12a radially outwardly of the round pillar 12a.

The first magnetic core 11 includes the hollow circular cylinder 11a disposed between the housing 21 and the exciting coil 14 and a first extending part 11b extending radially inwardly from the hollow circular cylinder 11a.

At least one magnetic viscoelastic elastomeric member 13 is arranged' to connect between the first magnetic core 11 and the second magnetic core 12 at at least one location (two locations, I.e., upper and lower locations, in this example) so that a closed magnetic circuit is formed. More specifically, the magnetic viscoelastic elastomeric member 13 is connected to the first magnetic core 11 and to the second magnetic core 12 in a direction perpendicular to a movable direction of the movable part 17 (in the horizontal direction in FIG. 1). The magnetic viscoelastic elastomeric member 13 is disposed to be annular for connection between an inner end of the first extending part 11b and an outer end of the second extending part 12b.

Figure 2A:
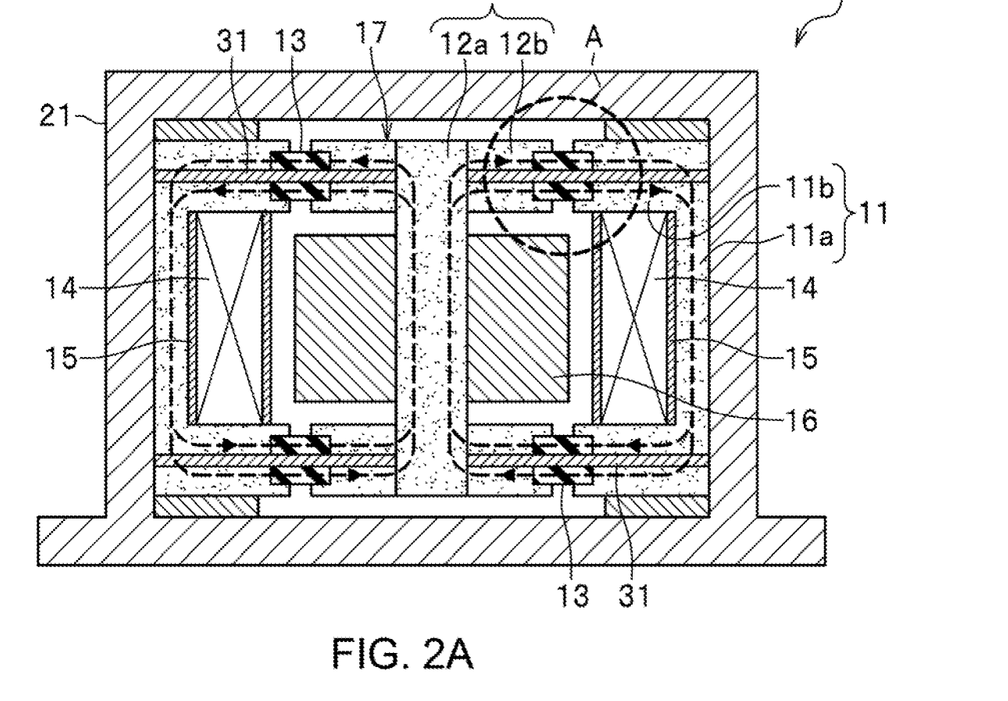
FIGS. 2A and 2B are explanatory diagrams illustrative of magnetic flux passing in the active vibration control device shown in FIG. 1.

In this example, when the exciting coil 14 is excited, as shown with the dotted arrows in FIG. 2A, a magnetic flux flows from the hollow circular cylinder 11a, via the upper first extending part 11b, the upper second extending part 12b, the round pillar 12a, the lower second extending part 12b, and the lower first extending part 11b, and returns to the hollow circular cylinder 11a, forming a closed magnetic circuit.

The magnetic viscoelastic elastomeric members 13 are members whose viscoelastic property varies in accordance with an intensity of the magnetic field generated by the exciting coil 14. More specifically, the magnetic viscoelastic elastomeric members 13 comprise an elastic material such as a rubber material to which magnetic particles, e.g., iron powder, are doped. The stiffness of the magnetic viscoelastic elastomeric members 13 is low when no magnetic field is present (or in a low magnetic field), and is high in a high magnetic field generated by the exciting coil 14.

The movable mass member 16, which is a non-magnetic mass member of the movable part 17, is provided on an outer periphery of the round pillar 12a.

A support member 31 is inserted in each magnetic viscoelastic elastomeric member 13 in a horizontal direction. The housing 21 and the movable part 17 are elastically connected with each other via both the magnetic viscoelastic elastomeric members 13 and the support members 31. Each of the support members 31 has a larger width in a direction in which the housing 21 and the movable part 17 are elastically connected with each other than that of the corresponding magnetic viscoelastic elastomeric member 13. The support members 31 are each a plate spring formed of a non-magnetic material, such as aluminum or stainless steel.

Figure 2B:
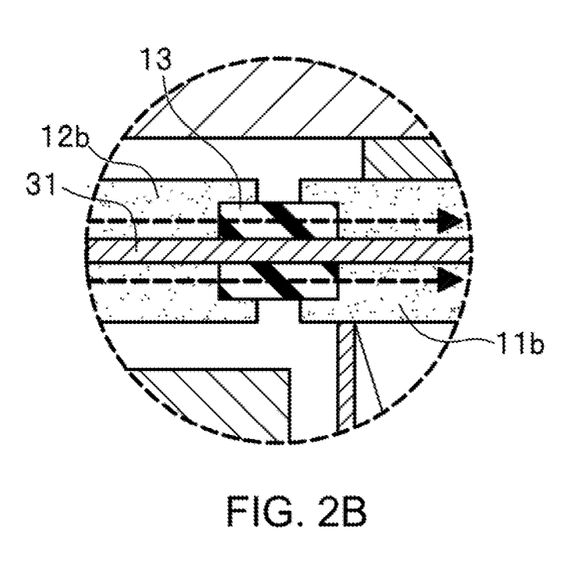

FIG. 2B illustrates, in an enlarged manner, how each support, member 31 is inserted horizontally in the corresponding magnetic viscoelastic elastomeric member 13.

Figure 3:
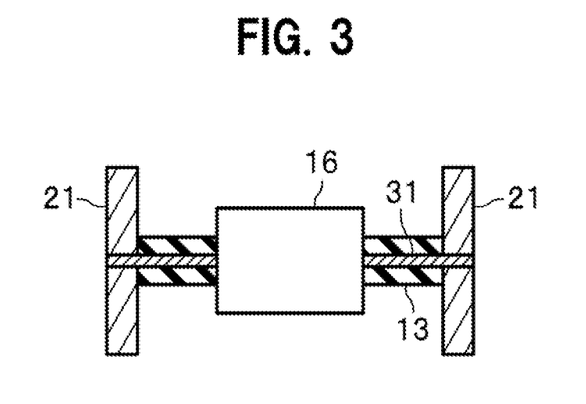
FIG. 3 is a conceptual diagram of the active vibration control device according to the first embodiment of the present invention.

FIG. 3 is a conceptual diagram of the active vibration control device 1. The movable m member 16 is indirectly supported by the housing 21 via the support member 31 and the magnetic viscoelastic elastomeric member 13.

Figure 4A:
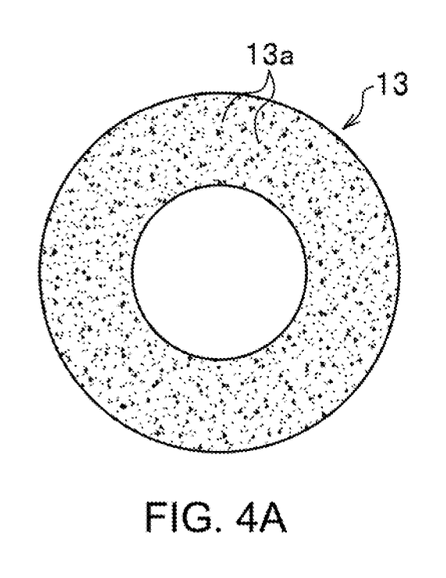
FIGS. 4A and 4B are each a plan view illustrating a configuration example of a magnetic viscoelastic elastomeric member according to the first embodiment of the present invention.
Figure 4B:
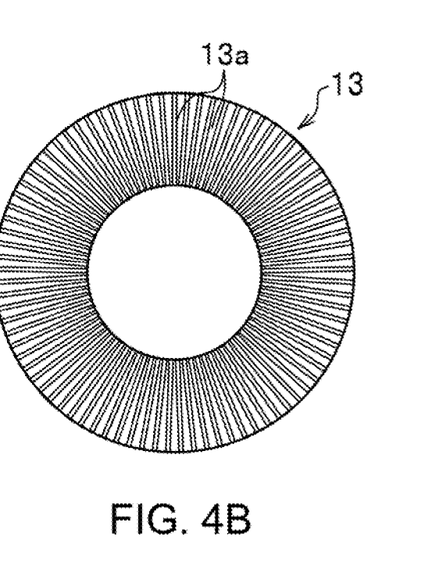

FIGS. 4A and 4B are plan views illustrating examples of the configuration of the magnetic viscoelastic elastomeric members 13. Each magnetic viscoelastic elastomeric member 13 has an annular shape. In the example shown in FIG. 4A, magnetic material powder 13a is distributed in the magnetic viscoelastic elastomeric member 13. In the example shown in FIG. 4A the magnetic material powder 13a in the magnetic viscoelastic elastomeric member 13 is aligned toward the center of the annular ring. Either example allows for changing the apparent stiffness in accordance with the strength of the magnetic flux flowing in the radial direction. The example shown in FIG. 4B can change the apparent stiffness of the magnetic viscoelastic elastomeric member 13 in accordance with the strength of the magnetic flux more effectively than the example shown in FIG. 4A.

Figures 5A, 5B:
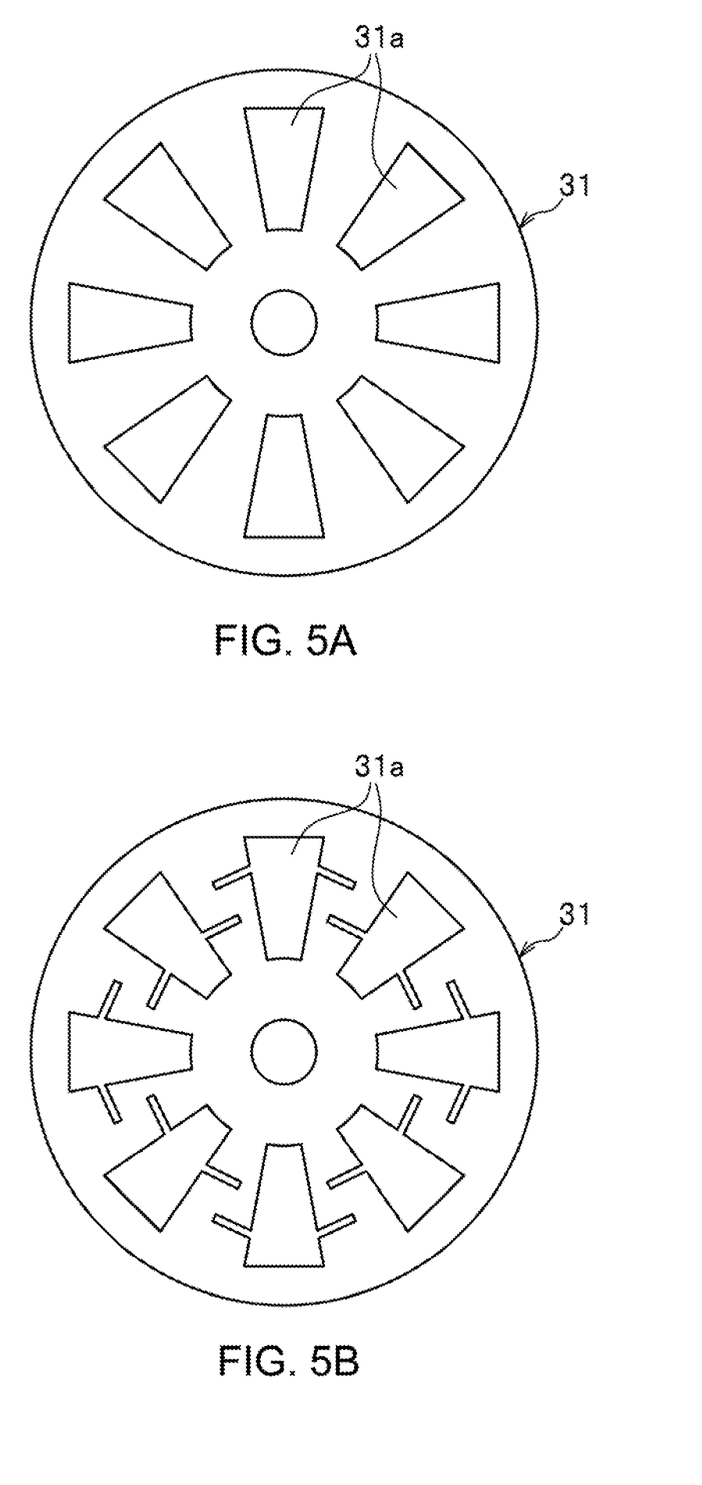
FIG. 5 is a plan view illustrating a configuration example of a support member of the active vibration control device according to the first embodiment of the present invention.

FIGS. 5A and 5B are plan views illustrating examples of the configuration of the support member 31. The support member 31 can have a shape like ones illustrated in FIGS. 5A and 5B, to change an eigenvalue of the vibration that occurs while supporting the movable mass member 16, by changing the thickness and the shape of the support member 31. Specifically, notched holes 31a are formed in the disk-shaped support member 31. With this configure ton, the support member 31 can vibrate with large amplitude and have low stiffness. The support member 31 may have, other than those shapes, a swirl shape.

Figure 6:
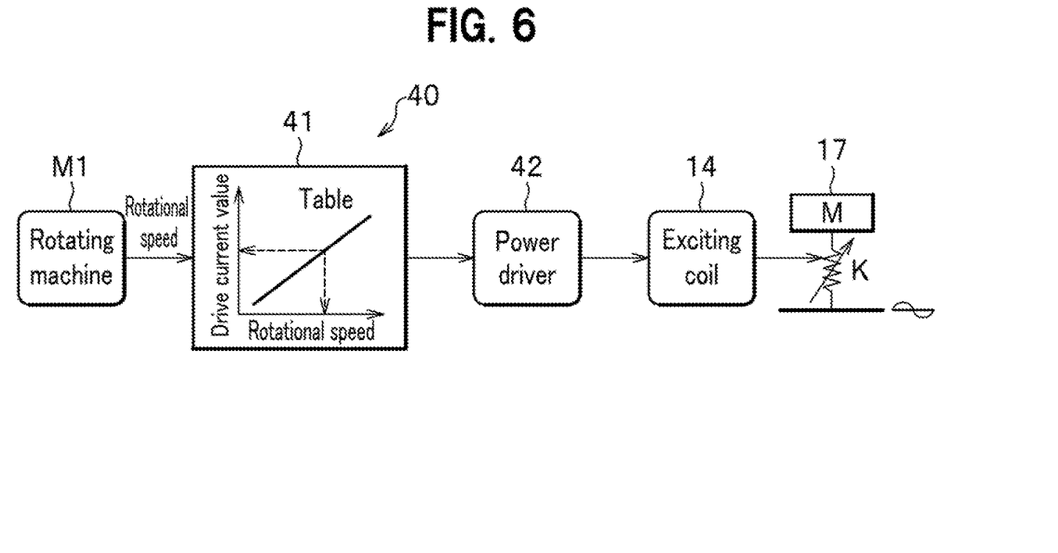
FIG. 6 is a general block diagram of a control system of the active vibration control device according to the first embodiment of the present invention.

FIG. 6 is a general block diagram of a control system 40 of the active vibration control device 1. A table 41 is used to obtain a drive current value according to a rotational speed of a rotating machine M1, for example, an engine in a vehicle. A power driver 42 configured including semiconductor switching elements, etc. applies the drive current to the exciting coil 14. Accordingly, the exciting coil 14 is excited with a drive current according to the rotational speed of the rotating machine M1. The magnetic field generated by the exciting coil 14 is changed in accordance with the rotational speed of the rotating machine M1. As a result, the stiffness of the magnetic viscoelastic elastomeric member 13 of the movable part 17 (mass M) is changed, and thus a spring constant (K) of the magnetic viscoelastic elastomeric member 13 is changed.

Next, a description will be given of the operation of the active vibration control device 1.

In the active vibration control device 1, when, due to the occurrence of vibrations, the magnetic viscoelastic elastomeric members 13 vibrate in the vertical direction in FIG. 1, a shearing force is applied to the magnetic viscoelastic elastomeric members 13 in the vertical direction in FIG. 1. As a result, alignment of the magnetic material powder 13a is deviated. In this state, when a magnetic field is applied to the magnetic material powder 13a with the exciting coil 14, particles of the magnetic material powder 13a tends to align in the direction of the magnetic field. This resists an external force, and thus the apparent stiffness of the magnetic viscoelastic elastomeric member 13 increases. This variation of the stiffness of the magnetic viscoelastic elastomeric member 13 changes a resonance frequency of the movable part 17. As a result, a frequency at which vibrations are to be damped is changed. As the variation in the stiffness in this case varies in accordance with the rotational speed of the engine, etc. of the vehicle on the basis of the table 41, the vibrations can be inhibited efficiently in accordance with variation in the rotational speed of the engine, etc. of the vehicle.

In the active vibration control device 1 according to the present embodiment, the first magnetic core 11 and the second magnetic core 12 are connected with each other in the housing 21 made of a non-magnetic material via the magnetic viscoelastic elastomeric members 13 to form a magnetic circuit in which the magnetic flux from the exciting coil 14 flows, forming a closed magnetic circuit. Thus, the magnetic viscoelastic elastomeric members 13 are arranged in the closed magnetic circuit. This structure allows for efficiently applying the magnetic field generated from the exciting coil 14 to the magnetic viscoelastic elastomeric members 13. Thus, this structure enhances the vibration isolation performance of the active vibration control device 1 and provides power saving.

In addition, the arrangement of support members 31 as described prevents irreversible elongation of the magnetic viscoelastic elastomeric member 203 due to over time deterioration thereof caused by the gravity constantly applied to the movable mass member 202.

In addition, especially when using a variable dynamic damper in a low frequency range, the structure can solve problems that occur when the movable mass member 202 is relatively heavy and the spring constant of the magnetic viscoelastic elastomeric member 203 holding the movable mass member 202 has to be set to a lower value. Specifically, first, the structure prevents the magnetic viscoelastic elastomeric member 203 from being unable to hold the movable mass member 202 due to a low spring constant of the magnetic viscoelastic elastomeric member 203 which is set to lower the eigenfrequency thereof. In addition, the structure prevents the movable mass member 202 from hanging down due to its own weight and causing an unusual sound occurring in the event of interference or the like. Moreover, the structure can prevent durability problems that may possibly occur as the spring property of the rubber material serving as a base of the magnetic viscoelastic elastomeric member 203 decreases due to an increase in the temperature of the magnetic viscoelastic elastomeric member 203 due to heat generated by the exciting coil or due to the environment. Moreover, the structure can prevent a problem such that managing the part characteristics of the magnetic viscoelastic elastomeric member 203 in mass production can be difficult due to property variations.

Moreover, as each of the support members 31 has a larger width in the direction in which the support member 31 is connected with the housing 21 than that of the corresponding magnetic viscoelastic elastomeric member 13, the support members 31 can reliably support the movable mass member 16. In addition, by inserting each support member 31 horizontally in the corresponding magnetic viscoelastic elastomeric member 13, the support member 31 and the corresponding magnetic viscoelastic elastomeric member 13 can be handled as an integrated member.

Second Embodiment

Figure 7:
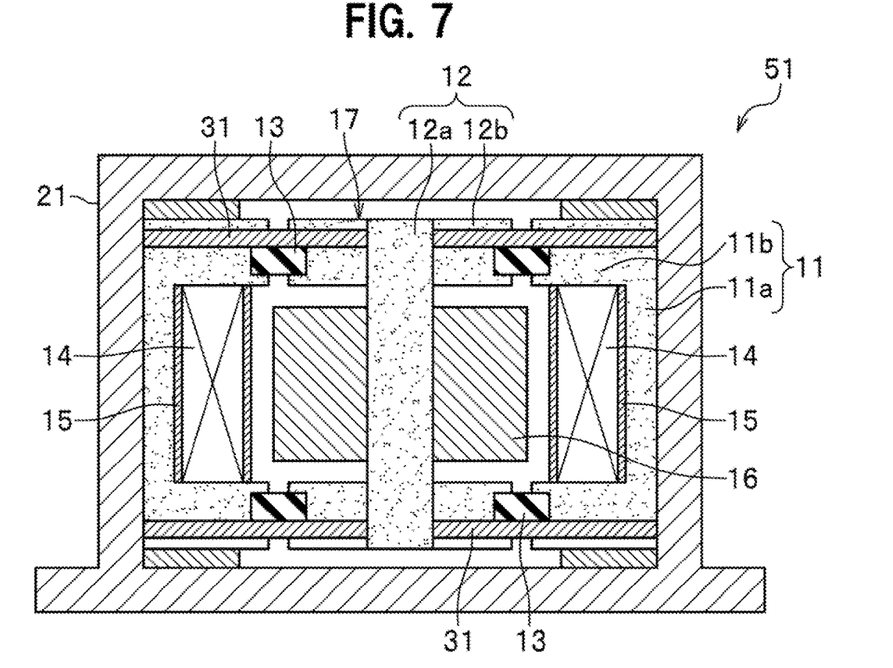
FIG. 7 is an elevational cross-sectional view of an active vibration control device according to a second embodiment of the present invention.
Figure 8A:
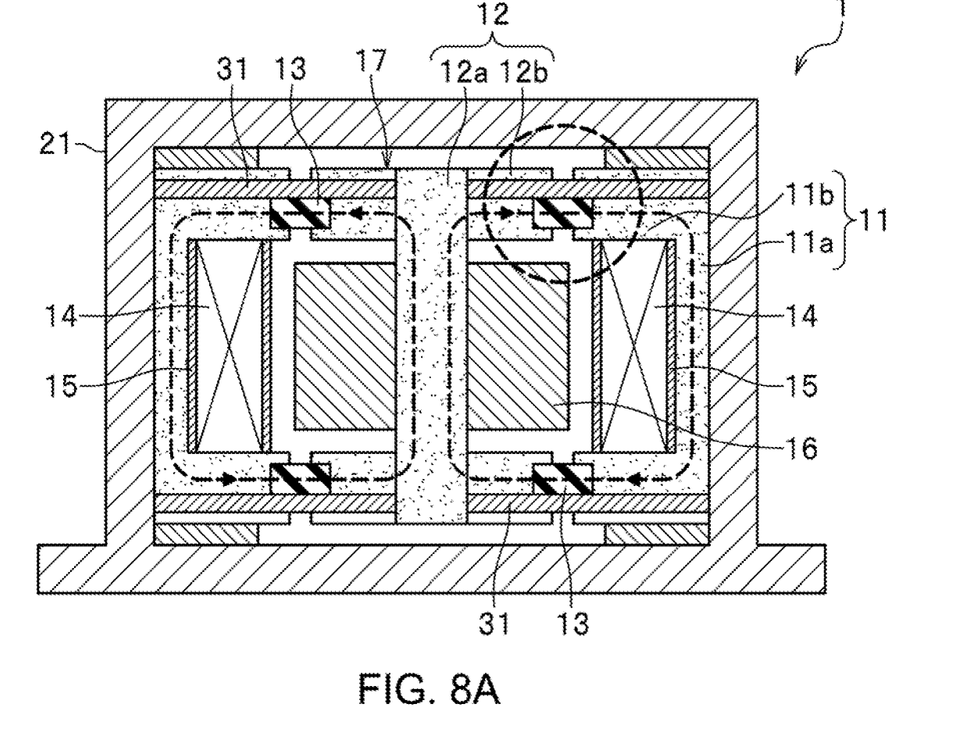
FIG. 8A is an elevational cross-sectional view illustrating magnetic flux flowing in the active vibration control device shown in FIG. 7.
Figure 8B:
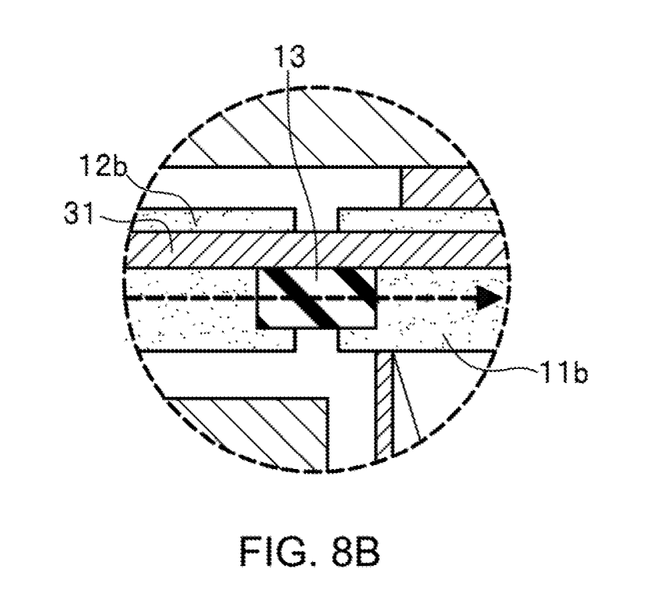
FIG. 8B is an enlarged partial view illustrating the magnetic flux.

FIG. 7 is an elevational cross-sectional view of an active vibration control device 51 according to a second embodiment of the present invention. FIG. 8A is an elevational cross-sectional view showing magnetic flux flowing in the active vibration control device 51 shown in FIG. 7. FIG. 8B is an enlarged partial view showing the magnetic flux. In the following description of the present embodiment, the same members as those in the first embodiment are given the same reference signs, and their detailed descriptions are omitted. The active vibration control device 51 differs from the active vibration control device 1 in that the support members 31 are not inserted in the magnetic viscoelastic elastomeric members 13.

Specifically, in the examples shown in FIGS. 7, 8A and 8B, one support member 31 is disposed on the upper magnetic viscoelastic elastomeric member 13 and other support member 31 is disposed under the lower magnetic viscoelastic elastomeric member 13.

Third Embodiment

Figure 9:
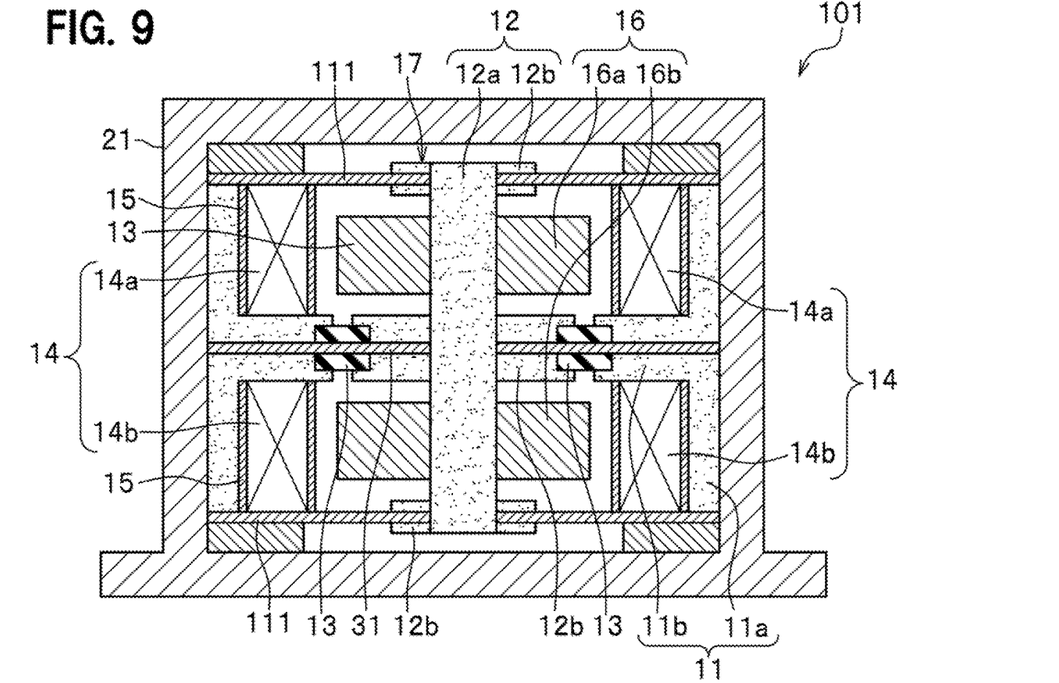
FIG. 9 is an elevational cross-sectional view of an active vibration control device according to a third embodiment of the present invention.
Figure 10:
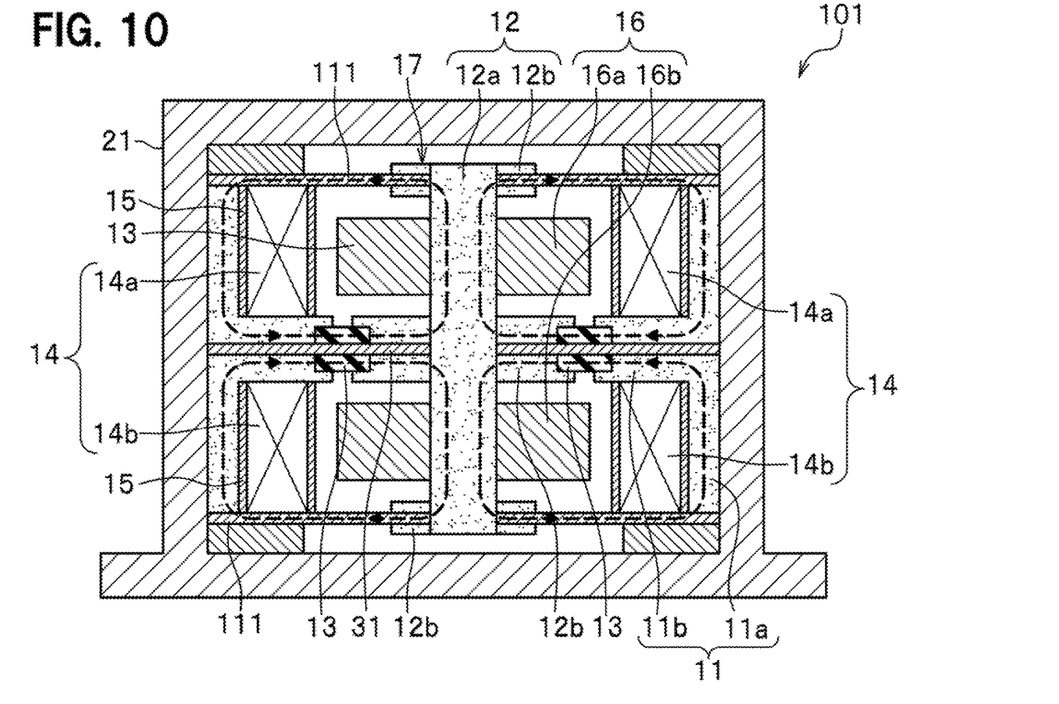
FIG. 10 is a diagram in trick flow of magnetic flux in the active vibration control device shown in FIG. 9 is indicated by dotted arrows.

FIG. 9 is an elevational cross-sectional view of an active vibration control device 101 according to a third embodiment of the present invention. FIG. 10 is a diagram in which flow of magnetic flux in the active vibration control device 101 is indicated by dotted arrows. In the following description of the present embodiment, the same members as those in the first embodiment are given the same reference signs, and their detailed descriptions are omitted.

The present embodiment differs from the first embodiment largely in that the exciting coil 14 is made up of an exciting coil 14a and an exciting coil 14b, which are configured in two tiers so that the direction of the magnetic flux generated by the exciting coil 14a is opposite to the direction of the magnetic flux generated by the exciting coil 14b as shown in FIG. 10.

Accordingly, whereas, in the first embodiment, the first extending parts 11b and the second extending parts 12b are configured in two tiers, i.e., upper and lower tiers, the active vibration control device 101 has first extending parts 11b and second extending parts 12b in three tiers, i.e., lower, middle, and upper tiers. The movable mass member 16 is made up of a movable mass member 16a and a movable mass member 16b, which are configured in two tiers.

The first extending part 11b and the second extending part 12b in the upper tier are connected to each other by a plate spring 111 made of a magnetic material. The first extending part 11b and the second extending part 12b in the middle tier are connected to each other by a support member 31 and a magnetic viscoelastic elastomeric member 13 in which the support member 31 is inserted in a horizontal direction. The first extending part 11b and the second extending part 12b in the lower tier are connected to each other by a plate spring 111 made of a magnetic material.

In this structure, the direction of the magnetic flux generated by the exciting coil 14a is opposite to the direction of the magnetic flux generated by the exciting coil 14b. Thus, the flows of magnetic flux generated from the exciting coils pass in the same direction in the magnetic viscoelastic elastomeric member 13, which allows the magnetic flux to flow in the magnetic viscoelastic elastomeric member 13 efficiently.

Figure 11:
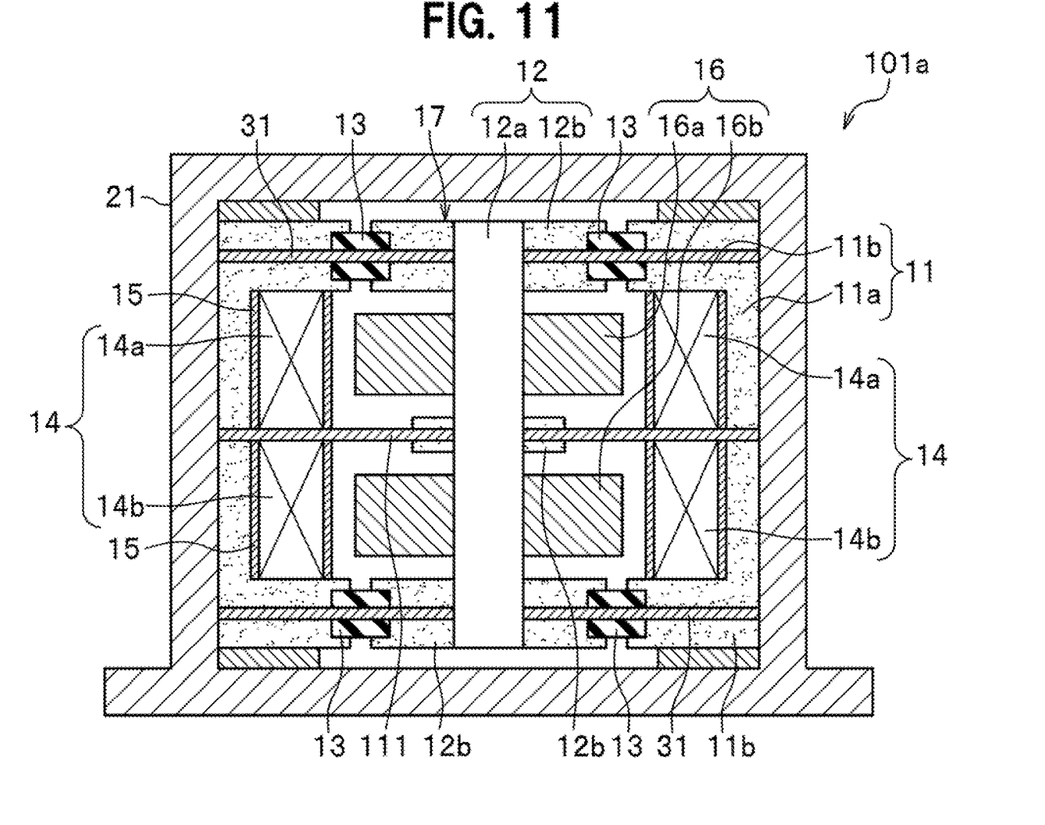
FIG. 11 is an elevational cross-sectional view of a modification example of the active vibration control device shown in FIGS. 9 and 10.

FIG. 11 is an elevational cross-sectional view of a modification example of the active vibration control device 101 shown in FIGS. 9 and 10. An active vibration control device 101a of this modification example differs from the active vibration control device 101 in the following points. The first extending part 11b and the second extending part 12b in the upper tier are connected to each other by a support member 31 and a magnetic viscoelastic elastomeric member 13 in which the support member 31 is inserted in a horizontal direction. The first extending part 11b and the second extending part 12b in the middle tier are connected to each other by a plate spring 111 made of a magnetic material. The first extending part 11b and the second extending part 12b in the lower tier are connected to each other by a support member 31 and a magnetic viscoelastic elastomeric member 13 in which the support member 31 is inserted in a horizontal direction.

Fourth Embodiment

Figure 12:
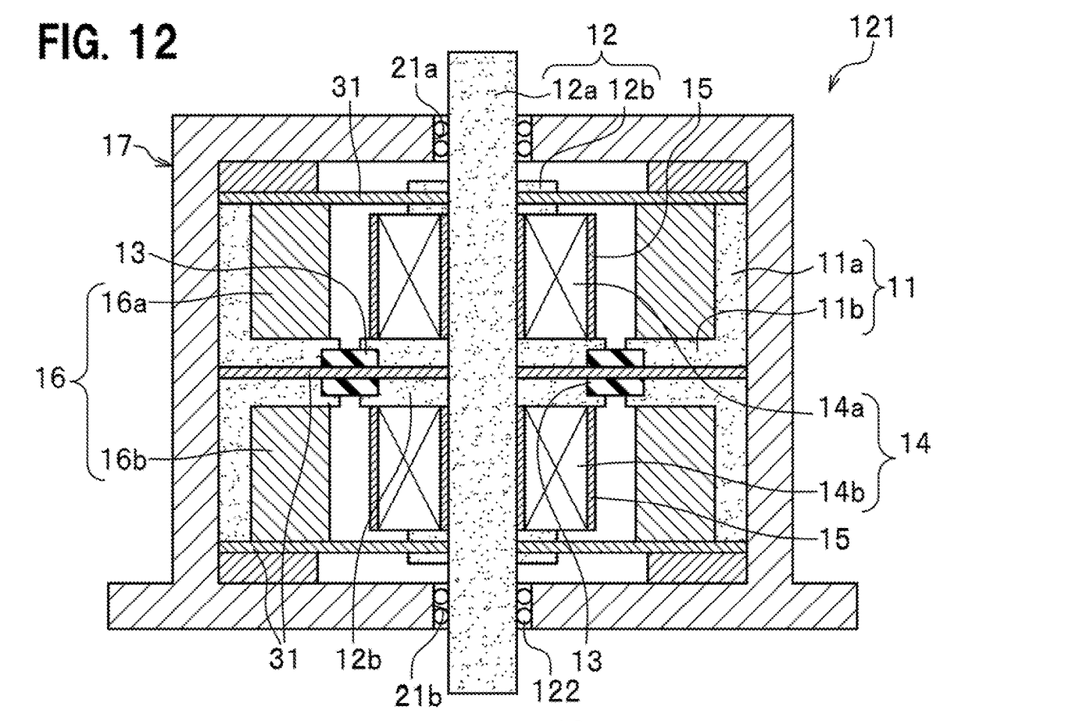
FIG. 12 is an elevational cross-sectional view of an active vibration control device according to a fourth embodiment of the present invention.

FIG. 12 is an elevational cross-sectional view of an active vibration control device 121 according to a fourth embodiment of the present invention. In the following description of the present embodiment, the same members as those in the third embodiment are given the same reference signs, and their detailed descriptions are omitted. The active vibration control device 121 differs from the active vibration control device 101 according to the third embodiment in that the exciting coil 14a and the exciting coil 14b are disposed in a central portion of the active vibration control device 121, i.e., on the outer periphery of the round pillar 12a. They also differ in that the movable mass member 16a and the movable mass member 16b are instead disposed on the outer side of the active vibration control device 121, i.e., on an inner periphery of the hollow circular cylinder 11a. Moreover, the housing 21 has through-holes 21a and 21b respectively in upper and lower portions of the housing 21 that are located on a line extending along an axial direction of the round pillar 12a. Upper and lower ends of the round pillar 12a respectively extend through the through-holes 21a and 21b to the outside of the housing 21. A linear bush 122 is disposed in each of the through-holes 21a and 21b.

Fifth Embodiment

Figure 13:
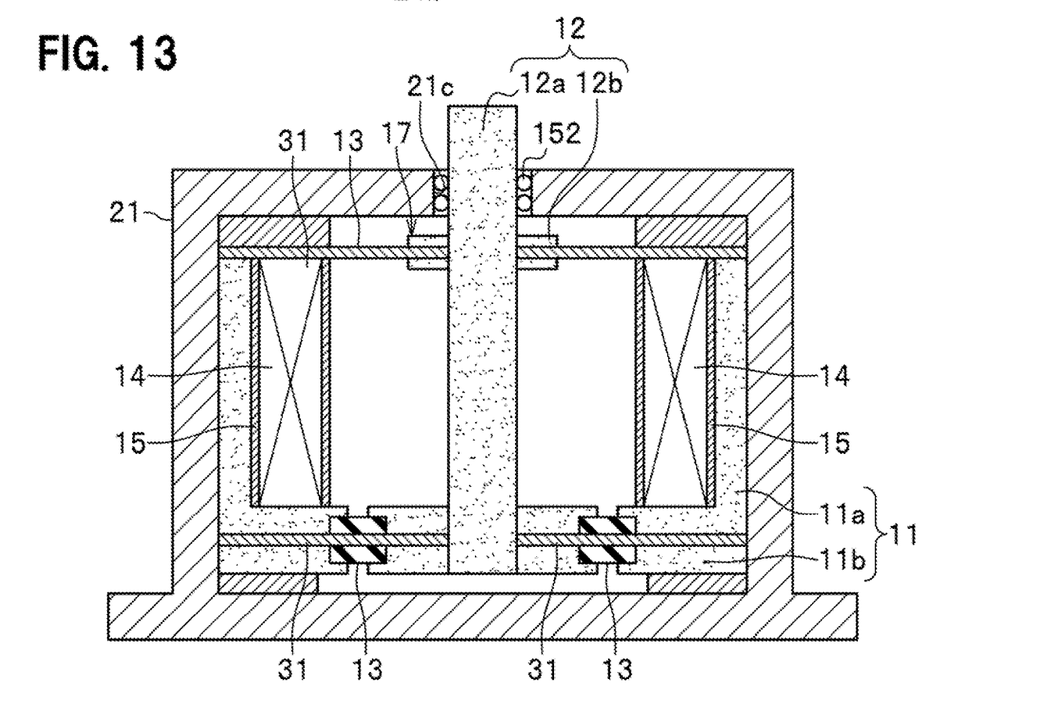
FIG. 13 is an elevational cross-sectional view of an active vibration control device according to a fifth embodiment of the present invention.

FIG. 13 is an elevational cross-sectional view of an active vibration control device 151 according to a fifth embodiment of the present invention. In the following description of the present embodiment, the same members as those in the first embodiment are given the same reference signs, and their detailed descriptions are omitted. This active vibration control device 151 is an example for use as a vibration isolation device.

In the present embodiment, the housing 21 has a through-hole 21c in an upper portion of the housing 21 that is located on a line extending along the axial direction of the round pillar 12a, and an upper end of the round pillar 12a extends through the through-hole 21a to the outside of the housing 21. The movable mass member 16 is not provided. The second magnetic core 12 serves as a movable mass member. The reference sign 152 indicates a linear bush. A tip end of the round pillar 12a that extends outside the housing 21 is connected to a vibration isolation target (not shown) to isolate vibration.

Manufacturing Method

Next, a description will be given of a plurality of examples of a method for disposing a magnetic viscoelastic elastomeric member 13 in the above described active vibration control devices.

A first method is to manufacture the magnetic viscoelastic elastomeric member 13 separately and then bond it to a support member 31. In this method, it is important to make the magnetic viscoelastic elastomeric member 13 in contact with the first magnetic core 11 and the second magnetic core 12. That is because, if a gap is created, magnetic flux does not efficiently pass the magnetic viscoelastic elastomeric member 13.

Figure 14A:
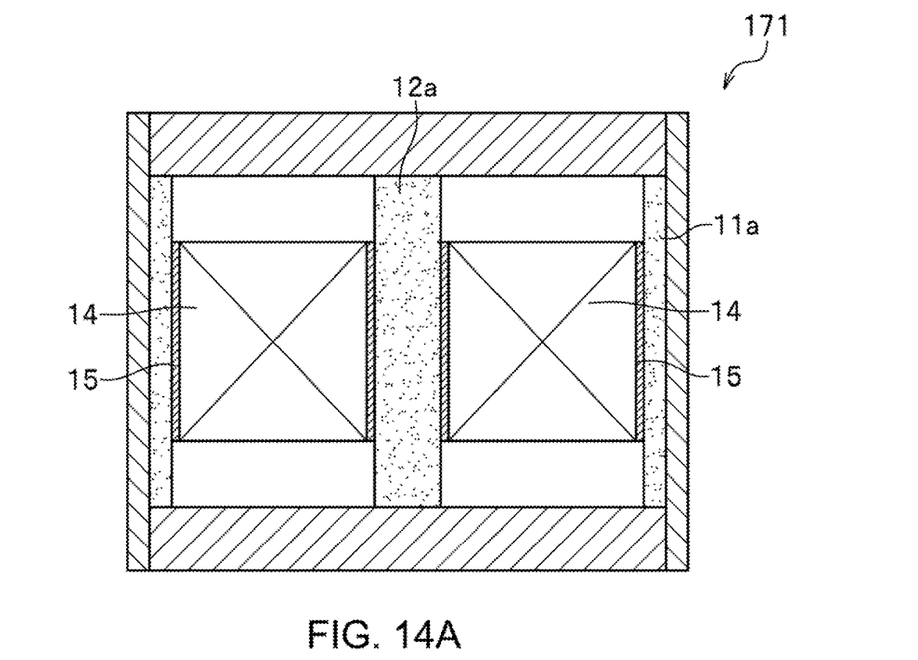
FIGS. 14A and 14B are explanatory diagrams illustrative of sequential steps of a method of disposing magnetic viscoelastic elastomeric members in an active vibration control device.
Figure 14B:
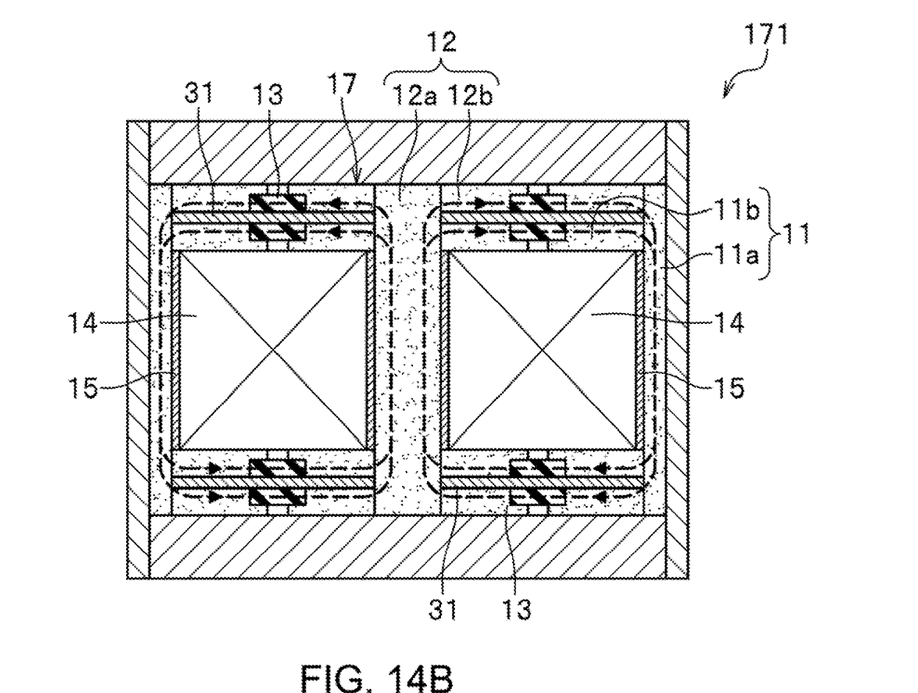

A second method comprises preparing a manufacturing jig 171 as shown in FIG. 14A, applying current through an exciting coil 14 to generate a magnetic field, and forming magnetic viscoelastic elastomeric members 13 while generating the magnetic field, to thereby manufacture the magnetic viscoelastic elastomeric members 13 whose magnetic material aligned in the radial direction. The second method forms magnetic viscoelastic elastomeric members 13 integrally with the first magnetic core 11 and the second magnetic core 12 (FIG. 14B).

REFERENCE SIGNS LIST 1 active vibration control device
13 magnetic viscoelastic elastomeric member
14, 14a, 14b exciting coil
17 movable part
21 housing
31 support member
11 first magnetic core (magnetic member)
12 second magnetic core (magnetic member)
111 plate spring (magnetic member)

The invention claimed is:

1. An active vibration control device comprising:
a housing;
a movable part including at least one movable mass member;
an exciting coil that generates a magnetic field with an intensity corresponding to a current supplied to the exciting coil;
a magnetic viscoelastic elastomeric member whose viscoelastic property changes in accordance with a magnitude of the magnetic field generated by the exciting coil; and
a support member made of a non-magnetic material,
wherein the housing and the movable part are elastically connected with each other by both the magnetic viscoelastic elastomeric member and the support member,
wherein the active vibration control device further comprises a plurality of magnetic members that forms an annular shaped, closed magnetic circuit through which the magnetic field generated by the exciting coil passes,
wherein the movable part includes at least one of the plurality of magnetic members, and
wherein the magnetic viscoelastic elastomeric member is disposed so as to connect the at least one of the plurality of magnetic members included in the movable part with another one of the plurality of magnetic members to form the closed magnetic circuit.

2. The active vibration control device of claim 1, wherein the support member has a larger width in a direction along which the housing and the movable part is connected with each other than a width of the magnetic viscoelastic elastomeric member in the direction along which the housing and the movable part is connected with each other.

3. The active vibration control device of claim 1, wherein the support member is inserted in the magnetic viscoelastic elastomeric member.

* * * * *